(12) United States Patent
Yamane et al.

(10) Patent No.: US 8,362,186 B2
(45) Date of Patent: Jan. 29, 2013

(54) COATING COMPOSITION AND A COATING THEREFROM HAVING WATERDROP SLIDING PROPERTY

(75) Inventors: Yuji Yamane, Annaka (JP); Noriyuki Koike, Takasaki (JP); Koichi Yamaguchi, Takasaki (JP); Hirofumi Kishita, Annaka (JP)

(73) Assignee: Shin-Etsu Chemical Company Co., Ltd., Tokyo (JP)

( * ) Notice: Subject to any disclaimer, the term of this patent is extended or adjusted under 35 U.S.C. 154(b) by 791 days.

(21) Appl. No.: 12/167,873

(22) Filed: Jul. 3, 2008

(65) Prior Publication Data

US 2009/0012220 A1    Jan. 8, 2009

(30) Foreign Application Priority Data

Jul. 3, 2007   (JP) ................................. 2007-175603
Jun. 27, 2008  (JP) ................................. 2008-168649

(51) Int. Cl.
*C08G 77/24*   (2006.01)
(52) U.S. Cl. .......................................... 528/36; 428/447
(58) Field of Classification Search .................... 528/36; 428/447
See application file for complete search history.

(56) References Cited

U.S. PATENT DOCUMENTS

2007/0149746 A1*  6/2007  Yamane et al. ................. 528/42

FOREIGN PATENT DOCUMENTS

| EP | 1801144 A2 | 6/2007 |
|---|---|---|
| JP | 10-059745 A | 3/1998 |
| JP | 2002-012452 A | 1/2002 |
| JP | 2003-238577 A | 8/2003 |

OTHER PUBLICATIONS

Extended European Search Report dated Jul. 8, 2009 for corresponding EP Application No. 08159520.9.

* cited by examiner

*Primary Examiner* — Kuo-Liang Peng
(74) *Attorney, Agent, or Firm* — Birch, Stewart, Kolasch & Birch, LLP

(57) ABSTRACT

A coating composition comprising a fluorine-containing silicon compound represented by the following formula (1)

$$Rf[QZ(-C_yH_{2y}-\underset{\underset{R_{3-a}}{|}}{Si}-X_a)_b]_2 \quad (1)$$

wherein Z is a linear or branched divalent polyorganosiloxane residue having 1 to 40 siloxane units, R is an alkyl group having 1 to 4 carbon atoms or a phenyl group, X is a hydrolyzable group, Q is a $C_{2-12}$ divalent connecting group, a is an integer of 2 or 3, b is an integer of from 1 to 10, y is an integer of 1 to 5, and Rf is a group represented by the following formula (2)

$$-Rf^1-(Q-W-Q-Rf^1)_q- \quad (2)$$

wherein $Rf^1$ is a perfluoropolyether residue, W is an organopolysiloxane residue having 1 to 40 siloxane units and Q is as defined above and may be the same with or different from each other, and q is an integer of from 0 to 3, and at least one solvent selected from the group consisting of alcohols, esters, ethers, ketones, and perfluoroethers. The coating prepared from the composition is oil-repellent, water-repellent and has water sliding property.

10 Claims, No Drawings

COATING COMPOSITION AND A COATING THEREFROM HAVING WATERDROP SLIDING PROPERTY

CROSS REFERENCES

This application claims benefit of Japanese Patent Application No. 2007-175603 filed on Jul. 3, 2007, and Japanese Patent Application No. 2008-168649 filed on Jun. 27, 2008, the contents of which are hereby incorporated by reference.

FIELD OF THE INVENTION

The present invention relates to a coating composition which provides water- and oil-repellency and water sliding property to a substrate such as window glass of vehicles or high-rise buildings and sanitary ware. The present invention also relates to a coating prepared therefrom.

BACKGROUND OF THE INVENTION

Compounds containing a perfluoropolyether moiety generally have very small surface free energy to have water and oil repellency, chemical resistance, lubricity, releasing property, and antifouling property. Making use of these properties, they are widely used as, for example, treatment agents to make paper or fiber water- and oil-repellent, and foul-resistant, lubricants for magnetic storage media, oil repellent agents for precision apparatuses, releasing agents, cosmetics, and protective films.

As a coating agent used for glass, pottery, and plastic films, a silane coupling agent is well known. The silane coupling agent has an organic group and a reactive silyl group, generally alkoxysilyl group, per molecule. The alkoxysilyl group is hydrolyzed by atmospheric moisture to form a coating layer by autocondensation reaction. It also chemically or physically binds to a surface of a substrate such as glass to fix the coating. Making use of this property, the silane coupling agent is widely used as a coating agent.

Japanese Patent Application Laid-Open No. 10-59745 discloses a fluoroalkyl silane compound. A coating made from the compound is water repellent and durable. However, once a waterdrop sticks on the coating, the waterdrop does not easily slide down. Waterdrop sliding property of a coating can be evaluated by sliding-down angle of waterdrop, hereinafter referred to waterdrop sliding-down angle. The angle is measured by placing a drop of 10 μl water on a coated surface of a substrate which is then tilted gradually and an angle at which the waterdrop starts sliding is measured.

Japanese Patent Application Laid-Open No. 2002-12452 discloses a coating of window glass of vehicles which coating is made of a copolymer of fluoroalkyltrichlorosilane with dimethylsiloxane having terminal silanol groups. The coating has good waterdrop sliding property. However, water repellency is not so durable: A water contact angle of a fresh coating is about 100 degrees but it is decreased to below 100 degrees by abrasion or scrubbing.

Japanese Patent Application Laid-Open No. 2003-238577 discloses a silane compound having a perfluoropolyether moiety introduced to a molecule to impart oil-repellency. Glass coated with the compound is water- and oil-repellent and easy to clean off oily dirt. However, its waterdrop sliding-down angle is larger than 10 degrees, which is not desirable.

Window glass of automobiles, trains, ships, airplanes, or high-rise buildings preferably has a waterdrop sliding-down angle small enough for the waterdrop to easily slide down or to be blown away by wind, because such glass allows reduced time and costs of maintenance. The glass preferably is oil-repellent, too, to clean off oily dirt and excretory substances of insects or animals easily. Surface of sanitary ware, kitchen ware and sewage pipes are preferably oil- and water-repellent.

SUMMARY OF THE INVENTION

An object of the present invention is to provide a coating composition which can form a durable oil-repellent, water-repellent coating having a small waterdrop sliding-down angle, specifically a coating which shows a water contact angle of 100 degrees or larger, an oil contact angle of 60 degrees or larger, and a waterdrop sliding-down angle of 10 degrees or smaller, and is resistant to scrubbing.

The present inventors have found that a coating made from a compound represented by the formula (1) formed on glass or a film having an inorganic oxide such as silicon dioxide layer thereon has good water sliding property, which is attributable to its siloxane moiety having limited number of silicon atoms, as well as oil- and water-repellency attributable to its perfluoropolyether moiety.

The present invention is a coating composition comprising a fluorine-containing silicon compound represented by the following formula (1)

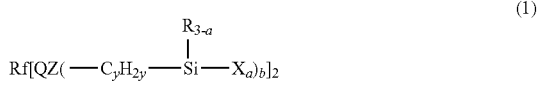

wherein Z is a linear or branched divalent polyorganosiloxane residue having 1 to 40 siloxane units, R is an alkyl group having 1 to 4 carbon atoms or a phenyl group, X may be the same with or different from each other and is a hydrolyzable group, Q is a $C_{2-12}$ divalent connecting group which may have an oxygen and/or nitrogen atom, a is an integer of 2 or 3, b is an integer of from 1 to 10, y is an integer of 1 to 5, and Rf is a group represented by the following formula (2)

$$-Rf^1-(Q-W-Q-Rf^1)_q- \qquad (2)$$

wherein $Rf^1$ is a perfluoropolyether residue, W is an organopolysiloxane residue having 1 to 40 siloxane units wherein W may be branched and may have a silalkylene group, and Q is as defined above and may be the same with or different from each other, and q is an integer of from 0 to 3, and at least one solvent selected from the group consisting of alcohols, esters, ethers, ketones, and perfluoroethers.

Coating prepared from the above coating composition has water sliding property and resistant to fouling with aqueous or oily dirt, and easy to clean. The fluorine-containing silicon compound is firmly bound to a substrate with its terminal functional groups, so that the above anti-fouling property is maintained for a long period of time.

PREFERRED EMBODIMENTS OF THE INVENTION

The fluorine-containing silicon compound represented by the following formula (1)

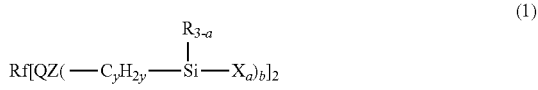

has a hydrolyzable group, X. It should be noted, therefore, that the fluorine-containing silicon compound herein encompasses hydrolyzates thereof and condensates of the hydrolyzate.

In the above formula (1), Rf is a group represented by the following formula (2)

$$-Rf^1-(Q-W-Q-Rf^1)_q- \quad (2)$$

wherein $Rf^1$ is a linear or branched divalent perfluoropolyether residue. The perfluoropolyether residue may comprise plurality of repeating units represented by the following general formula $$-C_jF_{2j}O-$$

wherein j is an integer of from 1 to 6. For example, the perfluoropolyether residue is represented by the formula $$-(C_jF_{2j}O)_k-$$

wherein k is an integer of from 1 to 500, preferably from 2, 400, more preferably from 10 to 200.

Examples of the aforesaid repeating unit include linear and branched unit as shown below.

—$CF_2O$—
—$CF_2CF_2O$—
—$CF_2CF_2CF_2O$—
—$CF(CF_3)CF_2O$—
—$CF_2CF_2CF_2CF_2O$—
—$CF_2CF_2CF_2CF_2CF_2CF_2O$—
—$C(CF_3)_2O$—

Preferred examples of the aforesaid repeating unit include linear and branched units as shown below.

—$CF_2O$—
—$CF_2CF_2O$—
—$CF_2CF_2CF_2O$—
—$CF(CF_3)CF_2O$—

Preferably, the perfluoropolyether residue is represented by the following formulas (3), (4) or (5):

$$-C_dF_{2d}(OCF_2CF)_mO(C_rF_{2r}O)_s(CFCF_2O)_nC_dF_{2d}- \quad (3)$$
$$\qquad\qquad |\qquad\qquad\qquad\qquad |$$
$$\qquad\qquad Y\qquad\qquad\qquad\qquad Y$$

wherein Y is F or $CF_3$, which may be different from each other, and r is an integer of from 2 to 6, d is an integer of from 1 to 3, each of m and n is an integer of from 0 to 200 with m+n ranging from 2 to 200, s is an integer of from 0 to 6, and the repeating units such as $(C_rF_{2r}O)$ may be bonded randomly;

$$-C_dF_{2d}O(CF_2CF_2CF_2O)_lC_dF_{2d}- \quad (4)$$

wherein l is an integer of from 1 to 200, and d is an integer of from 1 to 3;

$$-C_dF_{2d}(OCF_2CF)_m(OCF_2)_nOC_dF_{2d}- \quad (5)$$
$$\qquad\qquad\qquad |$$
$$\qquad\qquad\qquad Y$$

wherein Y is F or $CF_3$, d is an integer of from 1 to 3, each of m and n is an integer of from 0 to 200 with m+n ranging from 2 to 200, and the repeating units may be bonded randomly.

More preferably, a total number of the repeating units range from 1 to 60, most preferably from 10 to 50. Particularly preferred $Rf^1$ is represented by the following formula (6), $$-CF_2(OC_2F_4)_e(OCF_2)_fOCF_2- \quad (6)$$

wherein e is an integer of from 0 to 50, and f is an integer of from 1 to 50 with e+f ranging from 2 to 60, because a cured coating from a compound comprising such $Rf^1$ is resistant to fouling and abrasion.

In the formula (1), Q is a $C_{2-12}$ divalent group connecting Rf and Z, or $Rf^1$ and W. Q may have an oxygen and/or nitrogen atom and examples of Q include groups comprising amide, ether, ester or alkylene bonds such as those as shown below.

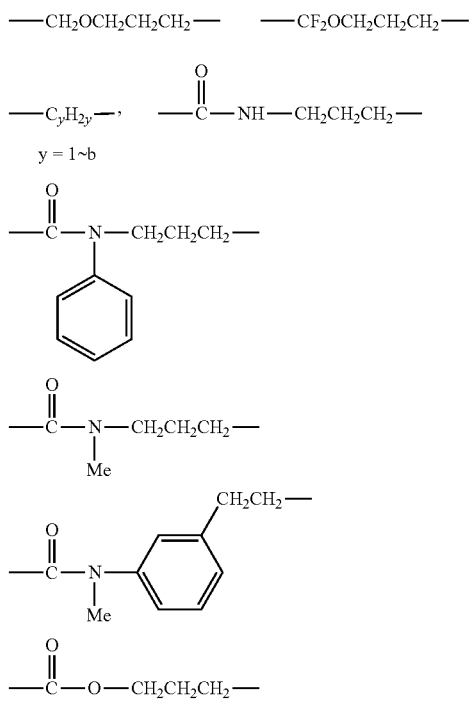

In the formula (1), Z is a divalent polyorganosiloxane residue having 1 to 40 siloxane unit, which residue may be branched. With a compound which lacks Z or has Z having a valency of three or more, or having more than 40 siloxane units, waterdrop sliding-down angle tends to exceed 10 degrees. The siloxane unit herein includes $R_{3/2}SiO_{1/2}$(M-unit), RSiO(D-unit), $R_{1/2}SiO_{3/2}$(T-unit), and $SiO_2$(Q-unit), wherein R is an organic group.

An example of Z is the following group.

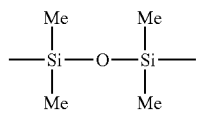

In the formula (2), W is an organopolysiloxane residue having 1 to 40 siloxane unit, which residue may be branched and may include a silalkylene group, —Si—$C_nH_{2n}$—Si—, wherein n is an integer. With an organopolysiloxane residue having more than 40 siloxane units, a coating made from a compound containing such residue tends to have a waterdrop sliding-down angle of larger than 10 degrees. Examples of the organopolysiloxane residue include residues represented by the following formulas (7) and (8).

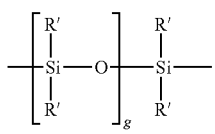  (7)

In the formula (7), g is an integer of from 1 to 40, and R' is an alkyl group having 1 to 4 carbon atoms or a phenyl group, which may be different among a plurality of R'.

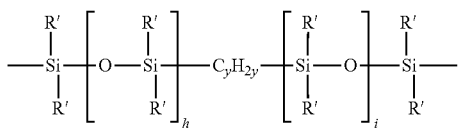  (8)

In the formula (8), y is an integer of from 1 to 5, h is an integer of from 1 to 40, i is an integer of from 1 to 40, with h+i ranging from 1 to 40, and R' is as defined above. Examples of W represented by the above formulas are as shown below wherein Me stands for a methyl group, Et for an ethyl group, and Ph for a phenyl group.

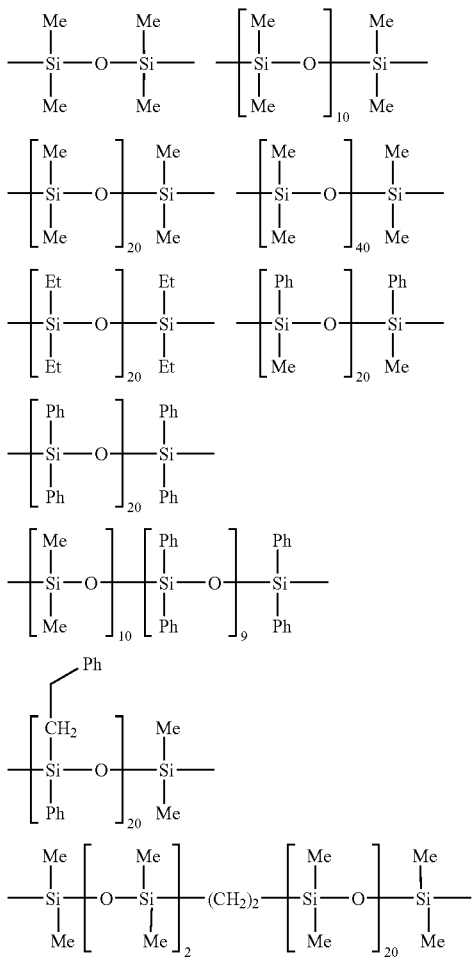

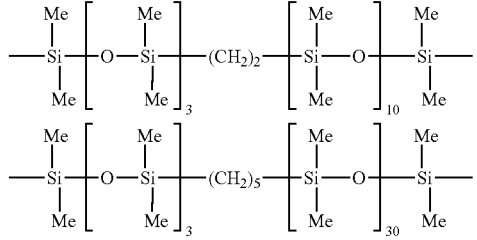

-continued

In the formula (1), X may be different from each other and is a hydrolyzable group. Examples of the hydrolyzable group include alkoxy groups having 1 to 10 carbon atoms such as methoxy, ethoxy, propoxy and buthoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; halogen atoms such as chlorine, bromine, and iodine atoms. Among these, methoxy, ethoxy, iropropenoxy groups and chlorine atom are preferred.

R is an alkyl group having 1 to 4 carbon atoms such as methyl and ethyl groups, or a phenyl group, among which a methyl group is preferred; a is 2 or 3, preferably 3, because of higher reactivity and stronger bonding to a substrate; and b is an integer of from 1 to 10, preferably 1 to 5, because of good adhesion to a substrate and resistance to fouling.

The coating composition of the present invention comprises a solvent or diluent. Examples of the solvent include alcohols such as ethyl alcohol and isopropyl alcohol; hydrocarbon solvents such as petroleum benzene, mineral spirits, toluene, and xylene; ester solvents such as ethyl acetate, isopropyl acetate, and butyl acetate; ether solvents such as diethyl ether, and isopropyl ether; ketone solvents such as acetone, methylethylketone, and methylisobutylketone, among which polar solvents such as alcohols, esters, ethers, and ketones are preferred. Particularly, isopropyl alcohol and methylisobutylketone are preferred because of good solubility, wettability and safety.

Fluorinated solvents are also preferred. Examples of the fluorinated solvents include fluorinated aliphatic hydrocarbon solvents such as perfluoroheptane and perfluoroctane; fluorinated aromatic hydrocarbon solvents such as m-xylene-hexafluoride and bezotrifluoride; fluorinated ether solvents such as methyl perfluorobutyl ether, ethyl perfluorobutyl ether, and perfluoro(2-butyltetrahydrofuran); fluorinated alkylamine solvents such as perfluorotributylamine, and perfluorotripentylamine; Among these, perfluorinated solvents, particularly perfluoroether solvents such as ethyl perfluorobutyl ether are preferred because of their higher dissolving capability and wetting capability.

A mixture of two or more of the aforesaid solvents may be used. The fluorine-containing silicon compound of the formula (1) and/or partial condensation products of hydrolyzates thereof are preferably dissolved homogeneously in the solvent.

The solvent may be used in such an amount that a solid content of the composition ranges from 0.05 to 1 wt %, particularly from 0.1 to 0.3 wt %. The solid content means a weight of non-volatiles. When the composition contains the after mentioned curing catalyst, the solid content is a total weight of the fluorine-containing silicon compound and the curing catalyst.

The coating composition preferably contains a curing catalyst as needed. Examples of the catalyst include organic titanate, organic titanium chelate compounds, organic aluminum compounds, organic zirconium compounds, organic tin compounds, organic carboxylates, amine compounds and salts thereof, quarterly ammonium compounds, alkali metal salts of lower fatty acids, dialkylhydroxylamine, organic silicon compounds having a guanidyl group, inorganic acids, perfluorocarboxylic acids and perfluoroalcohols, among which perfluorocarboxylic acids are preferred.

The curing catalyst may be incorporated in the composition in an amount of from 0.05 to 5 parts by weight, particularly from 0.1 to 1 part by weight per 100 parts by weight of the fluorine-containing silicon compound or condensate of hydrolyzates of the compound.

The coating composition may be applied to a substrate by any known application methods such as brushing, dipping, spraying and vapor deposition.

Applied composition is cured at a temperature selected depending on the application method. When the composition is applied by brushing or dipping, the composition is processed at a temperature preferably of from room temperature to 40° C., more preferably in a humidified environment to promote curing reaction. Process conditions, however, are preferably adjusted according to application method, substrate or the curing catalyst.

The coating composition may be applied to a substrate such as pottery, glass, organic materials having an inorganic oxide layer, metal oxide layer, hard coating on its surface, or organic materials surface treated with a silane coupling agent. For water- and oil-repellent treatment, paper, cloth, metals, glass, plastics, and ceramic can be used.

A cured coating layer of the composition typically has a thickness of from 1 nm to 50 nm, particularly from 3 nm to 20 nm.

The coating thus prepared is oil- and water-repellent, and has good water sliding property. These properties are useful for the objects of which maintenance are troublesome or which are prone to get dirty with substances such as grease, finger print, cosmetic, sun tan oil, excretory substance of human or animals. Examples of the objects include window glass of automobiles, trains, ships, airplanes, or high-rise buildings; headlight cover, out door goods, telephone booth, large outdoor display; sanitary ware such as bathtub and wash-basin; electric shaver, makeup tools, kitchen wall, water pool, and medical apparatuses.

EXAMPLES

The present invention is explained with reference to the following examples, but not limited thereto.

Examples 1-6

Coating compositions were prepared. Each of the after mentioned compounds 1 to 6 was dissolved in ethylperfluorobutyl ether, HFE-7200, ex Sumitomo 3M Co., to prepare 0.2 wt % solution to which perfluorocarboxylic acid was added in an amount of 0.2 wt % of solid content. In the coating composition thus prepared, a slide glass was dipped for 10 seconds and pulled up at pulling speed of 150 mm/min. The slide glass coated with the coating composition was kept in an environment of a temperature of 25° C. and a relative humidity of 40% for 24 hours to cure the composition.

Comparative Examples 1-5

Coating compositions were prepared. Each of the after mentioned compounds 7 to 11 was dissolved in ethylperfluorobutyl ether, HFE-7200, ex Sumitomo 3M Co., to prepare 0.2 wt % solution to which perfluorocarboxylic acid was added in an amount of 0.2 wt % of solid content. In the coating composition thus prepared, a slide glass was dipped for 10 seconds and pulled up at pulling speed of 150 mm/min. The slide glass coated with the coating composition was kept in an environment of a temperature of 25° C. and a relative humidity of 40% for 24 hours to cure the composition.

Cured coatings thus obtained were evaluated according to the following methods.

Water Repellency and Oil Repellency

Using contact angle meter, Model A3, ex Kyowa InterFACE Science Co., Ltd., water contact angle and oleic acid receding contact angle of the cured coating layer were measured.

Sliding-Down Angle of Waterdrop

Using contact angle meter, Model A3, ex Kyowa InterFACE Science Co., Ltd., a tilt angle of the slide glass at which a 10-µl waterdrop placed on the cured coating starts sliding down was measured.

Scrub Test

Using a rubbing tester, ex Shinto Scientific Co., Ltd., the cured coatings were scrubbed under the following conditions. Then, water- and oil-repellency, and sliding-down angle of waterdrop were measured in the same manner as described above.

Test environment: 25° C., relative humidity of 40%
Scrubbing material: The coating layers were scrubbed with a tip of the tester which was covered by eight sheets of nonwoven cloth (1.5 cm×1.5 cm) laid top on another and fixed by a rubber band.
Scrub distance (one way): 4 cm
Scrub speed: 500 cm/min
Load: 1 kg
Number of scrubbing: 6,000 times

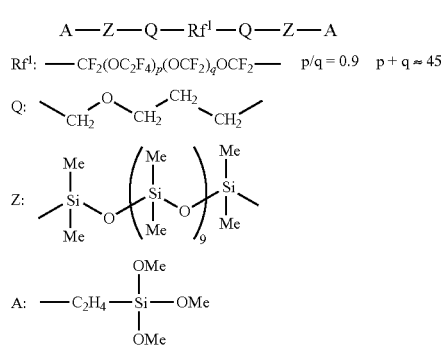

Compound 1

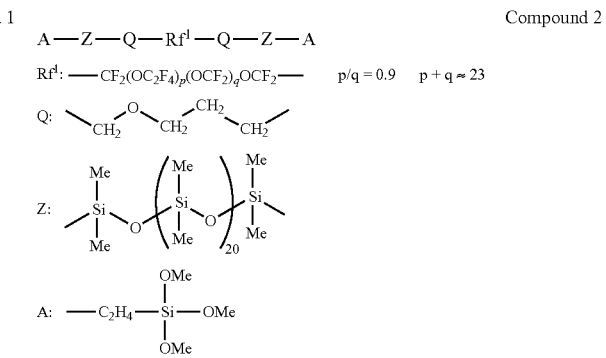

Compound 2

-continued
Compound 3
A—Z—Q—Rf—Q—Z—A
Rf: —Rf¹—Q—W—Q—Rf¹—
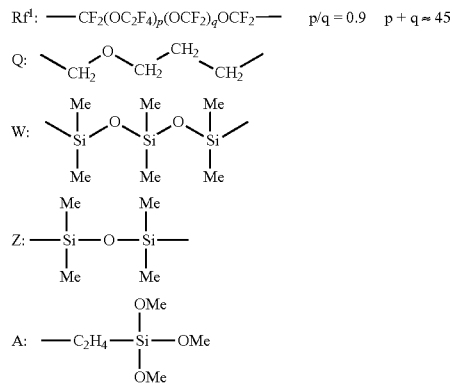
Compound 4
A—Z—Q—Rf—Q—Z—A
Rf: —Rf¹—Q—W—Q—Rf¹—
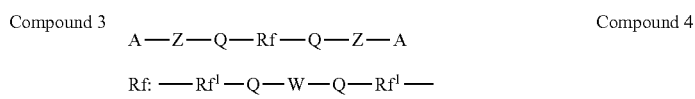
Compound 5
A—Z—Q—Rf—Q—Z—A
Rf: —Rf¹—Q—W—Q—Rf¹—
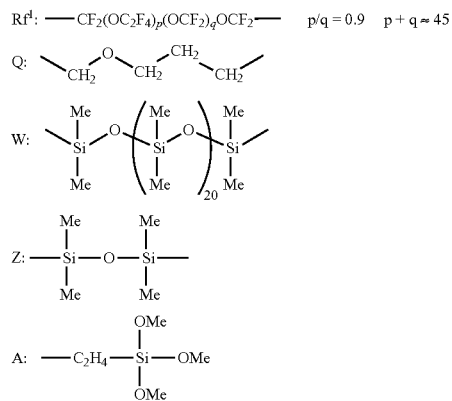
Compound 6
A—Z—Q—Rf—Q—Z—A
Rf: —Rf¹—Q—W—Q—Rf¹—
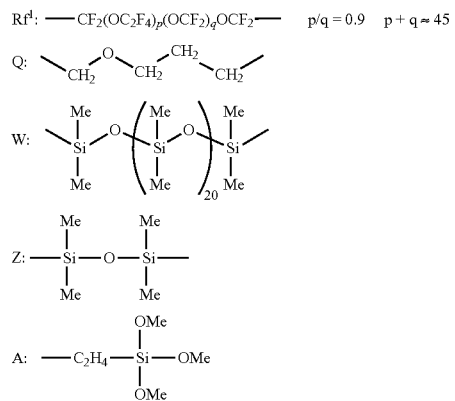
Compound 7
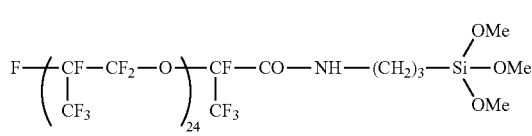
Compound 8
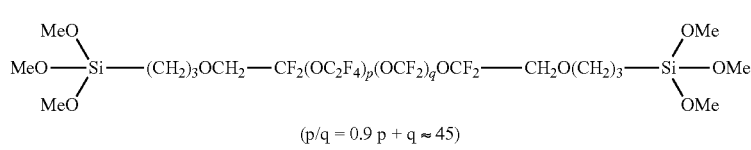
(p/q = 0.9  p + q ≈ 45)

-continued

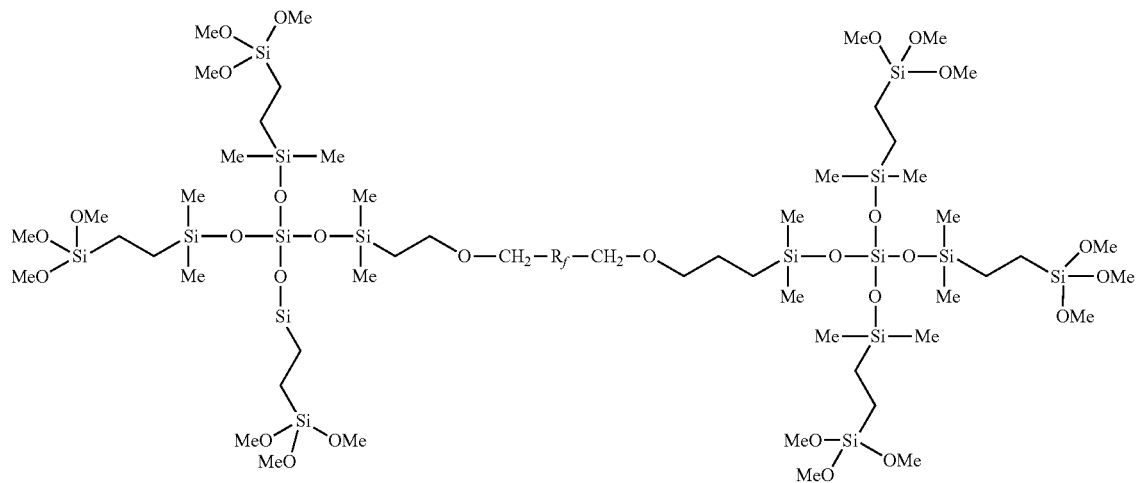

Compound 9

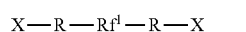   p/q = 0.9   p + q ≈ 45

Compound 10

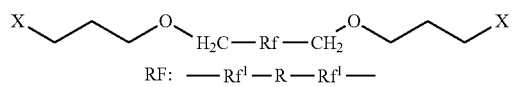

   p/q = 0.9   p + q ≈ 45

R: 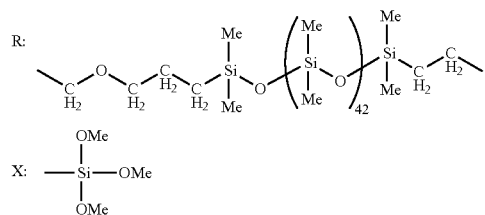

Compound 11

   p/q = 0.9   p + q ≈ 45

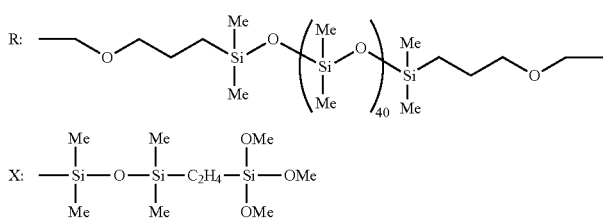

In the above formulas, value of p+q is an averaged value.

The results are as shown in Table 1, wherein "EX." stands for Example and "Comp. Ex." stands for Comparative Example.

TABLE 1

| | | Initial | | | After Scrub Test | | |
|---|---|---|---|---|---|---|---|
| | Compound No. | Water contact angle, deg | Waterdrop Sliding-down angle, deg | Oleic acid receding contact angle, deg | Water contact angle, deg | Waterdrop Sliding-down angle, deg | Oleic acid receding contact angle, deg |
| Ex. 1 | 1 | 106 | 2 | 68 | 104 | 5 | 62 |
| Ex. 2 | 2 | 102 | 3 | 64 | 107 | 6 | 60 |
| Ex. 3 | 3 | 107 | 2 | 68 | 108 | 2 | 64 |
| Ex. 4 | 4 | 106 | 2 | 68 | 108 | 5 | 65 |
| Ex. 5 | 5 | 104 | 5 | 68 | 108 | 7 | 64 |
| Ex. 6 | 6 | 104 | 5 | 67 | 108 | 7 | 64 |
| Comp. Ex. 1 | 7 | 116 | 16 | 75 | 85 | 21 | 56 |
| Comp. Ex. 2 | 8 | 109 | 13 | 70 | 108 | 14 | 68 |
| Comp. Ex. 3 | 9 | 107 | 11 | 66 | 107 | 12 | 66 |
| Comp. Ex. 4 | 10 | 104 | 10 | 66 | 100 | 14 | 55 |
| Comp. Ex. 5 | 11 | 106 | 10 | 67 | 106 | 12 | 66 |

All the coatings of Examples 1-6 and Comparative Example 1-5 had good water- and oil-repellency, showing a water contact angle of 100 degrees or larger and an oleic acid receding contact angle of 60 degrees of larger.

The coatings of Examples 1-6 also had good water sliding property, showing a sliding-down angle of less than 10 degrees.

Comparative Examples 1 and 2, both of which lacked Z moiety, and Comparative Example 3, which had a Z with more than three valency, showed a waterdrop sliding-down angle greater than 10 degrees.

Comparative Examples 4 and 5 had an organopolysiloxane reside with more than 40 siloxane units also showed a waterdrop sliding-down angle of greater than 10 degrees.

The invention claimed is:

1. A coating composition comprising
a fluorine-containing silicon compound represented by the following formula (1)

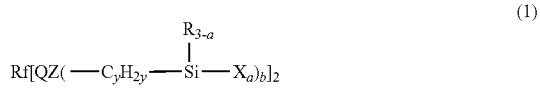
(1)

wherein Z is a linear or branched divalent polyorganosiloxane residue having 2 to 40 siloxane units, R is an alkyl group having 1 to 4 carbon atoms or a phenyl group, X may be the same with or different from each other and is a hydrolyzable group, Q is a $C_{2-12}$ divalent connecting group which may have an oxygen and/or nitrogen atom, a is an integer of 2 or 3, b is 1, y is an integer of 1 to 5, and Rf is a group represented by the following formula (2)

-Rf$^1$-(Q-W-Q-Rf$^1$)$_q$-     (2)

wherein Rf$^1$ is a perfluoropolyether residue, W is an organopolysiloxane residue having 3 to 40 siloxane units wherein W may be branched and may have a silalkylene group, and Q is as defined above and may be the same with or different from each other, and q is an integer of from 0 to 3, wherein said fluorine-containing silicon compound has at least seven siloxane units per molecule, and
at least one solvent selected from the group consisting of alcohols, esters, ethers, ketones, and perfluoroethers.

2. The composition according to claim 1, wherein the fluorine-containing silicon compound is contained in an amount of from 0.05 to 1 wt %.

3. The composition according to claim 1, wherein Rf$^1$ is represented by the following formula (3), (4), or (5):

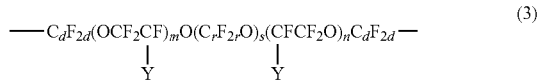
(3)

wherein Y may be the same with or different from each other and is a fluorine atom or a CF$_3$ group, r is an integer of from 2 to 6, d is an integer of from 1 to 3, each of m and n is an integer of from 0 to 200 with m+n ranging from 2 to 200, s is an integer of from 0 to 6, and the repeating units may be bonded randomly;

(4)

wherein l is an integer of from 1 to 200 and d is an integer of from 1 to 3; and

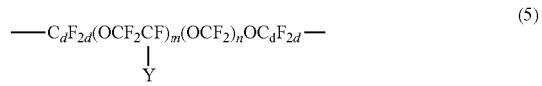
(5)

wherein Y is a fluorine atom or a CF$_3$ group, d is an integer of from 1 to 3, each of m and n is an integer of from 0 to 200 with m+n ranging from 2 to 200, and the repeating units may be bonded randomly.

4. The composition according to claim 1, wherein Rf$^1$ is represented by the following general formula (6)

(6)

wherein e is an integer of from 0 to 50, and f is an integer of from 1 to 50 with e+f ranging from 2 to 60.

5. The composition according to claim 1, wherein W is represented by the following formula (7) or (8)

(7)

wherein g is an integer of from 2 to 39, and R' may be the same with or different from each other and is an alkyl group having 1 to 4 carbon atoms or a phenyl group;

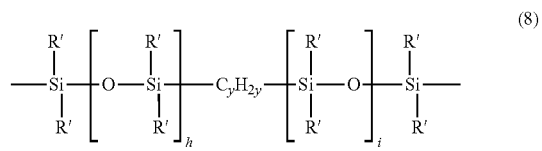
(8)

wherein y is an integer of from 1 to 5, h is an integer of from 1 to 37, i is an integer of from 1 to 37 with h+i ranging from 2 to 38, and R' is as defined above.

6. The composition according to claim 1, wherein X is an alkoxy group.

7. The composition according to claim 1, wherein the composition further comprises a curing catalyst.

8. The composition according to claim 1, wherein q is 0 and Z is a linear or branched divalent polyorganosiloxane residue having 11 to 40 siloxane units.

9. An article having a cured coating prepared from a coating composition comprising fluorine-containing silicon compound represented by the following formula (1)

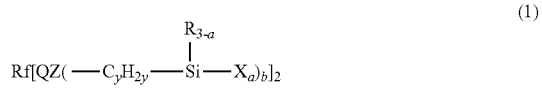
(1)

wherein Z is a linear or branched divalent polyorganosiloxane residue having 2 to 40 siloxane units, R is an alkyl group having 1 to 4 carbon atoms or a phenyl group, X may be the same with or different from each other and is a hydrolyzable group, Q is a $C_{2-12}$ divalent connecting group which may have an oxygen and/or nitrogen atom, a is an integer of 2 or 3, b is 1, y is an integer of 1 to 5, and Rf is a group represented by the following formula (2)

$$-Rf^1-(Q-W-Q-Rf^1)_q- \qquad (2)$$

wherein $Rf^1$ is a perfluoropolyether residue, W is an organopolysiloxane residue having 3 to 40 siloxane units wherein W may be branched and may have a silalkylene group, and Q is as defined above and may be the same with or different from each other, and q is an integer of from 0 to 3, wherein said fluorine-containing silicon compound has at least seven siloxane units per molecule, and at least one solvent selected from the group consisting of alcohols, esters, ethers, ketones, and perfluoroethers.

10. A method for providing a water sliding property to a surface of an article, comprising the steps of (1) applying a coating composition comprising fluorine-containing silicon compound represented by the following formula (1)

$$Rf[QZ(-C_yH_{2y}-\underset{\underset{X_a)_b]_2}{\overset{R_{3-a}}{|}}}{Si}]_2 \qquad (1)$$

wherein Z is a linear or branched divalent polyorganosiloxane residue having 2 to 40 siloxane units, R is an alkyl group having 1 to 4 carbon atoms or a phenyl group, X may be the same with or different from each other and is a hydrolyzable group, Q is a $C_{2-12}$ divalent connecting group which may have an oxygen and/or nitrogen atom, a is an integer of 2 or 3, b is 1, y is an integer of 1 to 5, and Rf is a group represented by the following formula (2)

$$-Rf^1-(Q-W-Q-Rf^1)_q- \qquad (2)$$

wherein $Rf^1$ is a perfluoropolyether residue, W is an organopolysiloxane residue having 3 to 40 siloxane units wherein W may be branched and may have a silalkylene group, and Q is as defined above and may be the same with or different from each other, and q is an integer of from 0 to 3, wherein said fluorine-containing silicon compound has at least seven siloxane units per molecule, and at least one solvent selected from the group consisting of alcohols, esters, ethers, ketones, and perfluoroethers to a surface of the article, and (2) curing the applied composition at room temperature.

* * * * *